United States Patent
Groseclose et al.

(10) Patent No.: US 10,579,351 B2
(45) Date of Patent: Mar. 3, 2020

(54) COMPUTER SPEED VIA METADATA-BASED BUSINESS RULE INTERPRETER

(71) Applicant: ADP, LLC, Roseland, NJ (US)

(72) Inventors: Joseph C. Groseclose, Brooklyn, NY (US); Robert Tucker, New York City, NY (US); Zachary Brandt, Brooklyn, NY (US); Aakash Kharche, Indore (IN); Satheesh Nagarajan, Chennai (IN); Darshan Kapadia, Secaucus, NJ (US)

(73) Assignee: ADP, LLC, Roseland, NJ (US)

( * ) Notice: Subject to any disclaimer, the term of this patent is extended or adjusted under 35 U.S.C. 154(b) by 95 days.

(21) Appl. No.: 15/686,159

(22) Filed: Aug. 25, 2017

(65) Prior Publication Data

US 2019/0065164 A1 Feb. 28, 2019

(51) Int. Cl.
*G06F 9/44* (2018.01)
*G06F 8/41* (2018.01)
*G06F 17/22* (2006.01)

(52) U.S. Cl.
CPC ............ *G06F 8/4441* (2013.01); *G06F 8/423* (2013.01); *G06F 8/427* (2013.01); *G06F 17/227* (2013.01)

(58) Field of Classification Search
CPC ........ G06F 8/423; G06F 8/427; G06F 8/4441; G06F 17/227
See application file for complete search history.

(56) References Cited

U.S. PATENT DOCUMENTS

| 7,610,575 | B2 | 10/2009 | Sproule | |
|---|---|---|---|---|
| 7,721,259 | B2 | 5/2010 | Heinke et al. | |
| 2012/0331452 | A1* | 12/2012 | Ogasawara | G06F 8/36 717/153 |
| 2013/0097114 | A1* | 4/2013 | Burke | G06F 16/90348 707/602 |

(Continued)

OTHER PUBLICATIONS

Sebastian Erdweg et al., Modular Specification and Dynamic Enforcement of Syntactic Language Constraints when Generating Code, ACM, 2014, retrieved online on Oct. 11, 2019, pp. 241-252. Retrieved from the Internet: <URL: http://delivery.acm.org/10.1145/2580000/2577089/p241-erdweg.pdf?>. (Year: 2014).*

(Continued)

*Primary Examiner* — Hanh Thi-Minh Bui
(74) *Attorney, Agent, or Firm* — Yee & Associates, P.C.

(57) ABSTRACT

A method of increasing a speed of operation of a computer via a metadata-based business rule interpreter. The method includes receiving, at a processor, user input defining a business rule. The method also includes translating, by the processor, the user input into a domain-specific language entirely consisting of metadata objects, wherein a translated syntax is formed, the translated syntax being an abstract syntax tree structure consisting of only the metadata objects. The method also includes executing, by the processor, an abstract syntax tree interpreter and taking as input into the abstract syntax tree interpreter the translated syntax. A compiler operation to generate computer code for implementing the business rule is avoided. Executing the abstract syntax tree interpreter produces a result in a browser without using executable code to achieve the result.

20 Claims, 8 Drawing Sheets

(56) References Cited

U.S. PATENT DOCUMENTS

| | | | |
|---|---|---|---|
| 2014/0282373 A1 | 9/2014 | Garza | |
| 2015/0331680 A1* | 11/2015 | Fee .................... | G06F 9/5027 717/146 |
| 2016/0062878 A1* | 3/2016 | Westrelin ............ | G06F 9/4552 717/130 |

OTHER PUBLICATIONS

Yoder, et al., "Adaptive Object-Models for Implementing Business Rules," Adaptive Object-Models: With Application to Medical Observations, Software Architecture Group—Department of Computer Science, Oct. 28, 2001, 10 pages.

\* cited by examiner

COMPUTER SPEED VIA METADATA-BASED BUSINESS RULE INTERPRETER

BACKGROUND INFORMATION

1. Field

The present disclosure relates to improving the speed of operation of a computer by using a metadata-based business rule interpreter which avoids using a compiler to generate executable code.

2. Background

Increasingly, businesses rely on business rule interpreters to conduct Internet based business, or to generate browser-based software programs for others to use in the conduct of business. However, such programs can be complex and can be undesirably slow to compile and/or execute in real time, especially on a web browser when communication with a remote computer is desirable or necessary. Thus, solutions for increasing the speed of operation of a computer to create and execute business rules are desirable.

SUMMARY

The illustrative embodiments provide for a method of increasing a speed of operation of a computer via a metadata-based business rule interpreter. The method includes receiving, at a processor, user input defining a business rule. The method also includes translating, by the processor, the user input into a domain-specific language entirely consisting of metadata objects, wherein a translated syntax is formed, the translated syntax being an abstract syntax tree structure consisting of only the metadata objects. The method also includes executing, by the processor, an abstract syntax tree interpreter and taking, as input into the abstract syntax tree interpreter, the translated syntax. A compiler operation to generate computer code for implementing the business rule is avoided. Executing the abstract syntax tree interpreter produces a result in a browser without using executable code to achieve the result.

The illustrative embodiments also contemplate a computer programmed to perform this computer-implemented method. The illustrative embodiments also contemplate a non-transitory computer-recordable storage medium storing program code which, when executed by a processor, performs the computer-implemented method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
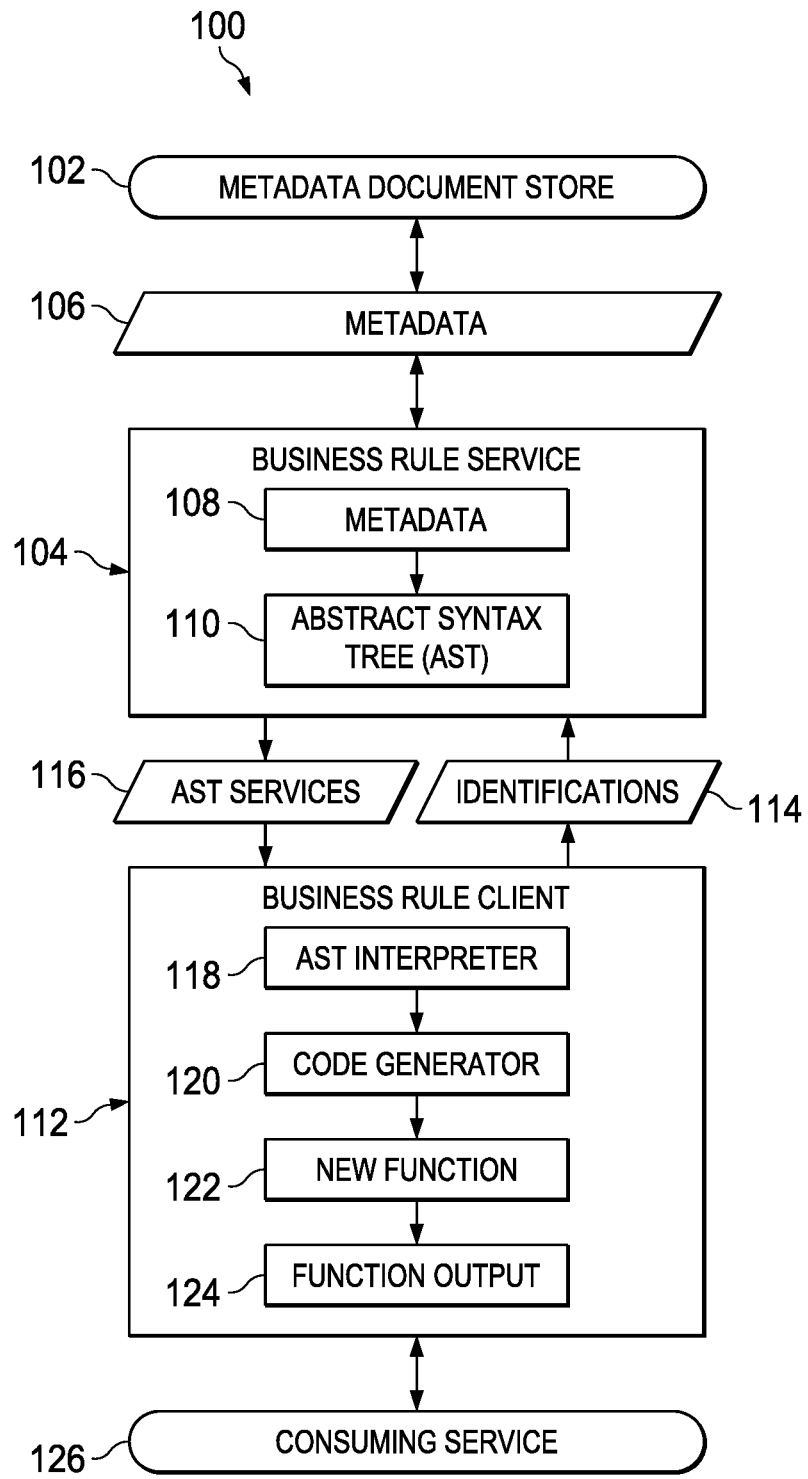
FIG. 1 is an illustration of a block diagram of a prior art architecture for a business rule system in accordance with an illustrative embodiment.

The illustrative embodiments recognize and take into account that current business rule systems are undesirably slow in terms of assembling, compiling, and/or executing business rule systems. As used herein, a "business rule" is computer code executable only by a computer, to produce a change in a computer, a server computer, at a remote client computer, or at a local client computer based on input from a server computer. While the term "computer rule" could be substituted for "business rule", it is customary in the business world to refer to computer rules that are used to aid in electronic services used in support of the business as "business rules". Thus, the term "business rule" should not be interpreted as a human-implemented procedure in a business environment, but rather strictly as an information technology implementation of hardware or software, as defined above.

As used herein, a "business system" is information technology hardware, possibly in combination with software, which is used to execute the electronic services used in support of the business. A business system may include server-side equipment and/or software, client-side equipment and/or software, or a combination thereof.

As used herein, a "business rule interpreter" is hardware or software which is used to interpret or execute business rules in a business system. Typically, a "business rule interpreter" is software residing in a Web browser on the client computer. However, the illustrative embodiments are not necessarily limited to only client computers or Web browsers.

The illustrative embodiments contemplate that many different business rule system architectures and business rule interpreters are possible. The illustrative embodiments provide for business rule systems which dramatically increase the speed of the operation of computers implementing business rules.

Thus, the illustrative embodiments provide for a business rule interpreter designed for a domain-specific language entirely composed of metadata objects. The business rule interpreter of the illustrative embodiments may take the form of an abstract syntax tree interpreter having a structure composed of metadata itself. The abstract syntax tree interpreter requires no complier because the constructs from which a metadata object is composed are well-defined when they are constructed. Thus, the compilation phase that precedes the execution of code under ordinary circumstances is non-existent and hence avoided. The tokenization and parsing that would occur become the translation of the user input into the well-defined metadata objects that result in the composition of the user selected block types and properties. As a result, executable code is not necessary.

In design, the business rule interpreter of the illustrative embodiments may be defined as a set of composable executor functions, each of which defines a single, atomic code construct as defined by the behavior belonging to the business rule domain-specific language. The atomic code constructs may be blocks visually presented to a user on a browser, which the user combines in an input area of a display monitor. Combinations of these atomic code constructs generate combinations of executor functions, which the abstract syntax tree described above interprets and then implements in the browser. Hence compilation and executable code are entirely avoided, resulting in a dramatic increase in speed of the computer. The increase of speed has been measured to be ten time faster, or more, compared to prior business rule interpreters which rely on compilation, executable code, and runtime of that executable code.

The executor functions of the business rule interpreter all operate inside of a context defined at a beginning of the business rule execution step, which is the target object for all symbols in the course of a business rule execution as well as for all input to and output from the business rule itself. The different permutations of the compositions of these functions, as well as differentiated input, are what enable the execution of different business rule behaviors at runtime. In essence, the business rules of the illustrative embodiments execute from the abstract syntax tree interpreter from the runtime metadata definition of the business rule alone.

The illustrative embodiments also recognize and take into account that prior business rule systems were not as maintainable as desired and not as secure as desired, in addition to not being as fast as desired. The illustrative embodiments recognize and take into account that the illustrative embodiments increase security through the use of pre-defined executor functions defined by metadata. The illustrative embodiments also recognize and take into account that the illustrative embodiments are easily maintainable simply by defining additional executor functions, or by modifying the definitions of existing executor functions. Hence, the illustrative embodiments represent a highly significant improvement in the art of business system architectures.

Stated differently, the business rule interpreter of the illustrative embodiments is a code interpreter designed for a domain-specific language entirely composed of metadata objects. This compiler takes the form of an abstract syntax tree (AST) interpreter with the exception that the abstract syntax tree (AST) structure is the composed metadata itself. This structure requires no compilation because the constructs from which the metadata object are composed are well-defined when they are constructed. So, the compilation phase that precedes the execution of code in the business rule interpreter is non-existent. The tokenization and parsing that would occur would be the translation of user input into well-defined metadata objects which would result in the composition of the user selected block types and properties.

In design, the business rule interpreter is a set of infinitely-composable executor functions, each of which defines a single, atomic code construct as defined by the behavior (and actual visual "blocks") belonging to the business rule domain-specific language. These functions all operate inside of a context defined at the beginning of the business rule execution step which is the target object for all symbols defined in the course of the business rule execution, as well as for all input to and output from the business rule itself. The different permutations of the compositions of these functions, as well as differentiated input, are what enable the execution of the different business rule behaviors at runtime.

The architecture described in this document assumes conditions about the environment in which it is run, as well as the business decisions driving the platform in which it is used. The metadata passed into the business rule interpreter is dynamic. Thus, the single source of truth associated with the metadata provided to the interpreter is the actual metadata provided by the metadata document store. No pre-compilation has occurred on the metadata documents before they have been passed to the interpreter, including contextual overrides.

As indicated above, the illustrative embodiments use executor functions. The executor function is the basic unit of structure and function in the business rule interpreter. It is a singular code point which correlates to business rule metadata object created by the business rule designer, which in turn is manipulated by the user to create desired business rules. An executor can represent as little code as possible to allow rules to be composed. All of the executors in the business rule interpreter take the context of the business rule currently in execution as well as a business rule metadata object entity for a single block inclusive of its children and returns the same context updated with the behavior of the executor itself.

The illustrative embodiments also use "helpers" to implement the business rule systems described herein. Helpers perform similar functionality to executors, executing JAVASCRIPT® against translated business rule metadata objects, with the exception that they do not necessarily take the same arguments or return the same values. All of the executors in the business rule interpreter take the context of the business rule currently in execution, as well as a business rule metadata object entity for a single block inclusive of its children and returns the same context updated with the behavior of the executor itself. Helpers always use a business rule execution context, as well as some other arguments, but not necessarily a business rule metadata object. They can return anything. The distinction between helpers and other utilities is that helpers use a business rule execution context or a business rule metadata object whereas the utility functions of executors are generic.

In the business rule systems of the illustrative embodiments, all date types may be transferable. This fact implies that no matter what type of date identifier is passed, it will be coerced into the same JAVASCRIPT® date type.

In addition, the business rule interpreter accepts International Organization for Standardization (ISO) strings or epoch times as date-like type arguments. However, it assumes that these arguments are always in a universal format. One way to create a date from a business rule is with a "date-manipulation" with type of "create" and this operation will create a UTC date regardless of the time zone of the created date. The only exception to UTC handling of JAVASCRIPT® dates is in the "string-manipulation" block with a "format" type. This block will localize a date before formatting it to the specified format. The reason this procedure is done is that the executor is predominantly creating "display" values.

Dates may be returned as International Organization for Standardization (ISO) strings. Output parameters that are of any of the date-like types or dates in notification messages will always be International Organization for Standardization (ISO) strings. If the value associated with an output parameter from a business rule of type "date," "datetime," or "time" happens to be an invalid date, it cannot be converted into an International Organization for Standardization (ISO) string and therefore will return a null value.

FIG. 1 is an illustration of a block diagram of a prior art architecture for a business rule system depicted in accordance with an illustrative embodiment. Business rule system 100 includes server side components, such as metadata document store 102 and business rule service 104. Metadata document store 102 is a storage where the contextual information about user information is stored. Metadata 106 is exchanged between metadata document store 102 and business rule service 104.

Business rule service 104 includes metadata 108 and abstract syntax tree (AST) 110. Business rule service 104 represents the existing service which generates an actual abstract syntax tree. Thus, business rule service 104 takes the metadata that the business rule interpreter understands and massages it into an abstract syntax tree that can then be processed by a code interpreter such as Escodogen, described below.

Business rule service 104 exchanges information with business rule client 112 via identifications 114 and AST services 116. Business rule client 112 includes AST interpreter 118, which is not based solely on metadata objects. Business rule client 112 also includes code generator 120. Code generator 120, in one illustrative embodiment, may be an Escodegen code generator. Escodegen is a JAVASCRIPT® executable code generator from an abstract syntax tree. Escodegen is from a parser application programming interface by MOZILLA®. Other code generators are possible, such as Babylon. In any case, business rule client 112 requires a compiler and the execution of executable code generated by the compiler. This executable code generates new function 122 that provides function output 124 to consuming service 126. Consuming service 126 represents the service that actually requested that some behavior be performed and a business rule be executed. Consuming service 126 is not necessarily restricted to a web page, but could be a button or any other caller of the business rule.

Business rule client 112 is the entire scope of code running in the user's browser, but has no environment, which performed the steps described above. The result is a code string passed a new function, which is generally considered a security fallacy inside of browsers because it will parse any code given to it, even malicious JAVASCRIPT® strings, and parsing functional output. The illustrative embodiments avoid this security problem by avoiding the injection of code.

Business rule system 100 requires a complier operation and the generation of and execution of executable code. Thus, business rule system 100 operates about ten times slower than the business rule systems of the illustrative embodiments, at least with respect to the generation time and execution time of executable code with existing systems.

Figure 2:
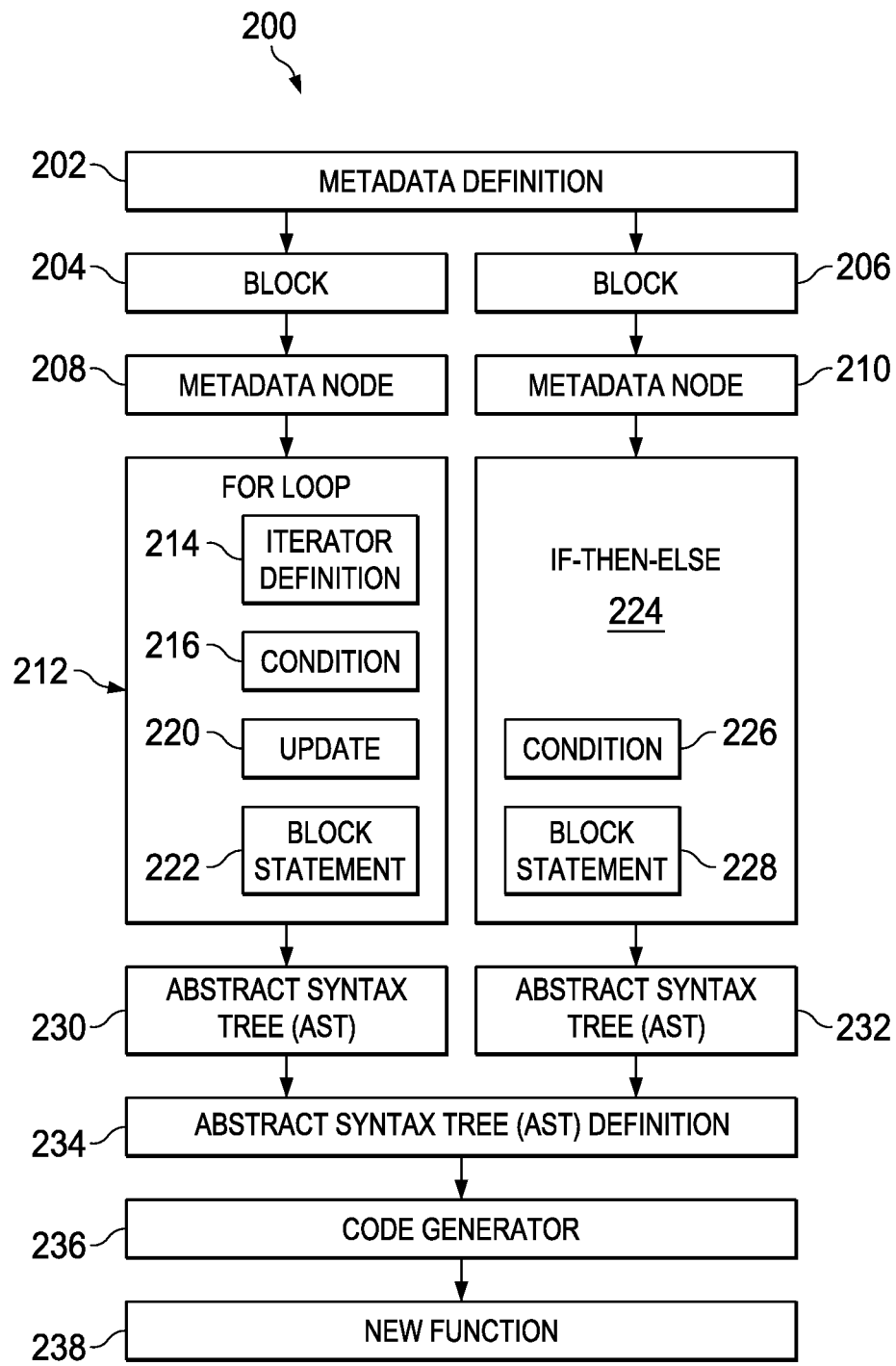
FIG. 2 is an illustration of a block diagram of a block diagram of a prior art architecture for a business rule system in accordance with an illustrative embodiment.

FIG. 2 is an illustration of a block diagram of a prior art architecture for a business rule system depicted in accordance with an illustrative embodiment. Business rule system 200 begins with a metadata definition 202 of business rules. Metadata definition 202 is parsed into blocks, such as block 204 and block 206. Block 204 is provided to metadata node 208 and block 206 is provided to metadata node 210. Block 204 and block 206 may be the same, representing a visual component of the code dragged and dropped by a user to represent the input.

Metadata node 208 is implemented in "FOR loop" 212, which includes iterator definition 214, condition 216, update 220, and block statement 222. "FOR loop" 212 represents code for a component. This code breaks down what is actually parsed by a complier into child blocks. The condition is the "FOR loop" condition. The block statement is the code that lives in the iterator block. Update and pre-condition are the boundaries of the loop.

Metadata node 210 is implemented using an "IF-THEN-ELSE" 224 statement, including condition 226 and block statement 228. Metadata node 210 is intended to represent the metadata at the block level after it has been composed and after it passed to the code generator for compilation into an abstract syntax tree. "IF-THEN-ELSE" 224 statement represents another code component. It breaks down what is actually parsed by a compiler into child blocks. The condition is the "if-then-else" condition. The block statement is the code that lives in either the consequent or the alternate block statements of code executed as a result of the "if-then-else" code.

The results of "FOR loop" 212 is provided to abstract syntax tree (AST) 230. The abstract syntax tree (AST) is the SpiderMonkey AST yielded for the parsing of each metadata node into abstract syntax tree (AST) in the prior art. These nodes are rolled up into the definition of the abstract syntax tree (AST) represented by the entire script or business rule. The result of "IF-THEN-ELSE" 224 statement is provided to abstract syntax tree (AST) 232. In turn, the abstract syntax trees provide abstract syntax tree (AST) definition 234. This definition is then provided to code generator 236, which may be an Escodegen code generator. Escodegen is a tool which will generate code strings from an abstract syntax tree (AST). In turn, code generator 236 creates new function 238, which then may be executed client-side to execute a desired new business rule. New function 238 is supported in JAVASCRIPT®, and will take a string and convert it into a callable JAVASCRIPT® function. It is considered a security fallacy in most cases.

This process is time consuming, because it requires converting a metadata definition into a format (AST definition 234) which can be read by a compiler (code generator 236) to create new function 238. The illustrative embodiments eliminate all of these intervening components, as shown in the following figures, thereby dramatically increasing the speed of execution of the computer. Note that prior to the illustrative embodiments, there was no known way to eliminate code generator 236 or to use abstract syntax trees (AST) in a novel way to implement the illustrative embodiments. Thus, the illustrative embodiments represent a significant advance over the prior art shown in FIG. 1 and FIG. 2.

Figure 3:
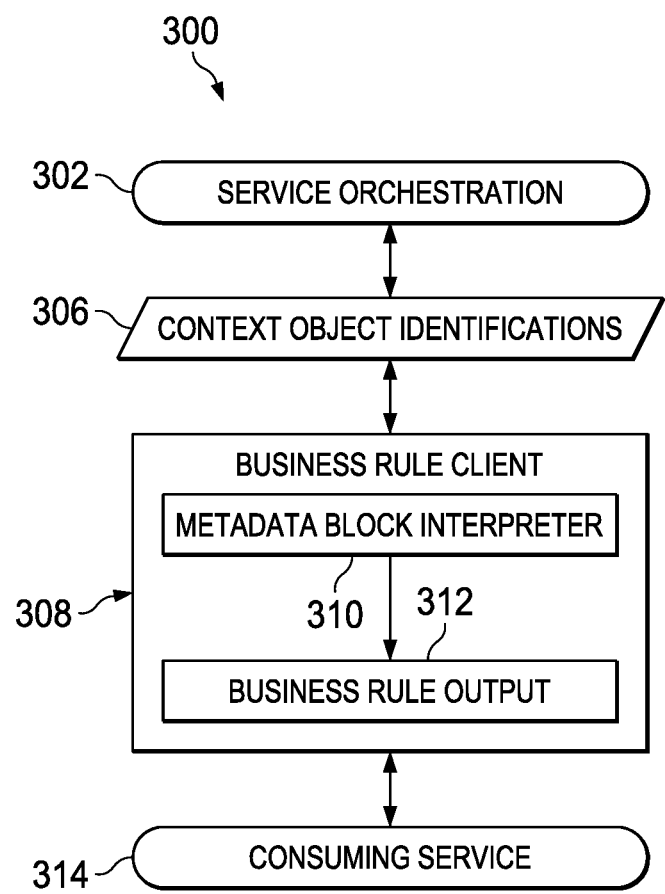
FIG. 3 is an illustration of a block diagram of an architecture of a metadata-based business rule system in accordance with an illustrative embodiment.

FIG. 3 is an illustration of a block diagram of an architecture of a metadata-based business rule system depicted in accordance with an illustrative embodiment. Business rule system 300 is an example of the novel business rule systems described herein. Business rule system 300 is presented as a network-based business system including both server computers and client computers. These computers may be, for example, data processing system 900 of FIG. 9. Business rule system 300 may represent a browser loop for the business rule interpreter.

Business rule system 300 includes service orchestration 302. Service orchestration is a client-side or node computer which presents a user interface (UI) that allows a user to combine blocks, each representing an executor function that is a pre-defined atomic unit of code. Service orchestration 302 may be where the interpreter fetches metadata. It is not necessarily a restful request, but may be any methodology used to provision the metadata used by the business rule interpreter, which is the primary function of the business rule client. After the user has selected the desired atomic units of code, either alone or in combination, one or more context object identifications 306 is provided to business rule client 308, which is a server-side computer. The identifications are the identifications against which metadata documents can be resolved.

Business rule client 308 includes metadata block interpreter 310 and business rule output 312. Metadata block interpreter 310 interprets the metadata provided from service orchestration 302 and directly generates business rule output 312 as a result. Business rule client 308 may be referred to as the engine inside the application. Business rule client 308 may be a wrapper around the interpreter intended to separate the logic of metadata retrieval and resolution, not complication, but duplicating and caching, from the actual metadata interpretation. Note that metadata block interpreter 310 may also be referred to as a business rule interpreter.

Figure 6:
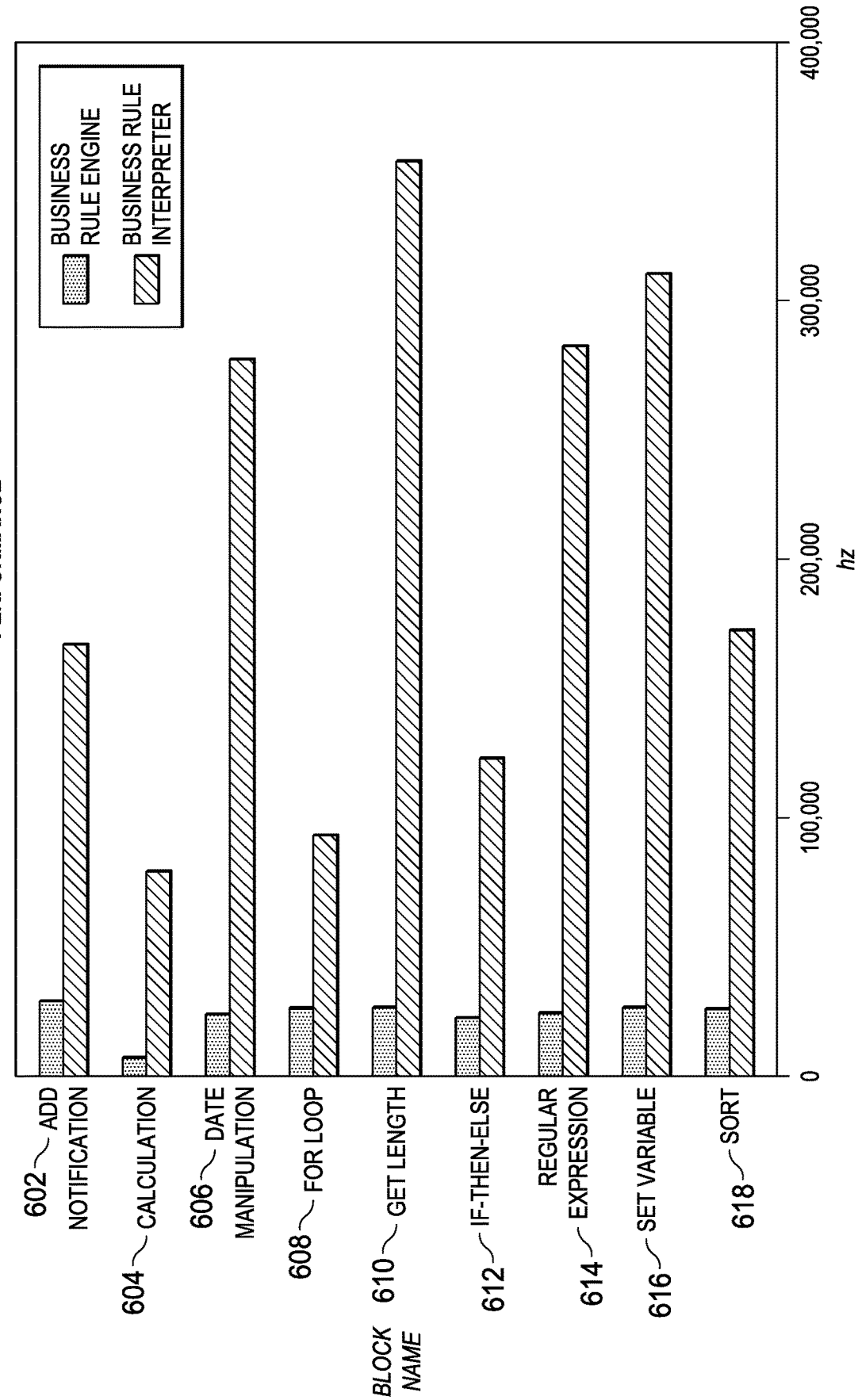
FIG. 6 is an illustration of a graph comparing the speed of execution of a prior art compiler-based business rule system, such as those shown in FIG. 1 and FIG. 2, to a metadata-based business rule system, such as those shown in FIG. 3 through FIG. 5, based on testing in a real business environment in accordance with an illustrative embodiment.

Business rule output 312 is already executable because it is generated from the pre-determined atomic units of code specified by the executor functions selected client-side. Business rule output 312 is the output provided by the business rule interpreter corresponding to the metadata and input values passed into the business rule interpreter. Thus, business rule output 312 is provided directly to consuming service 314, which executes the business rule or rules output by business rule output 312. By avoiding translation of metadata and compilation of executable code, the speed of both rule generation and rule execution is dramatically increased, as shown in FIG. 6

Consuming service 314 represents the service that actually requested that behavior be performed and a business rule be executed. Consuming service 314 is not necessarily restricted to a webpage, but could be a button or any other caller of the business rule. Note that the business rule interpreter of the illustrative embodiments are isomorphic, or environment independent.

Business rule system 300 is a specific implementation of the illustrative embodiments. Thus, business rule system 300 does not necessarily limit the claimed inventions, or other business rule systems described herein.

Figure 4:
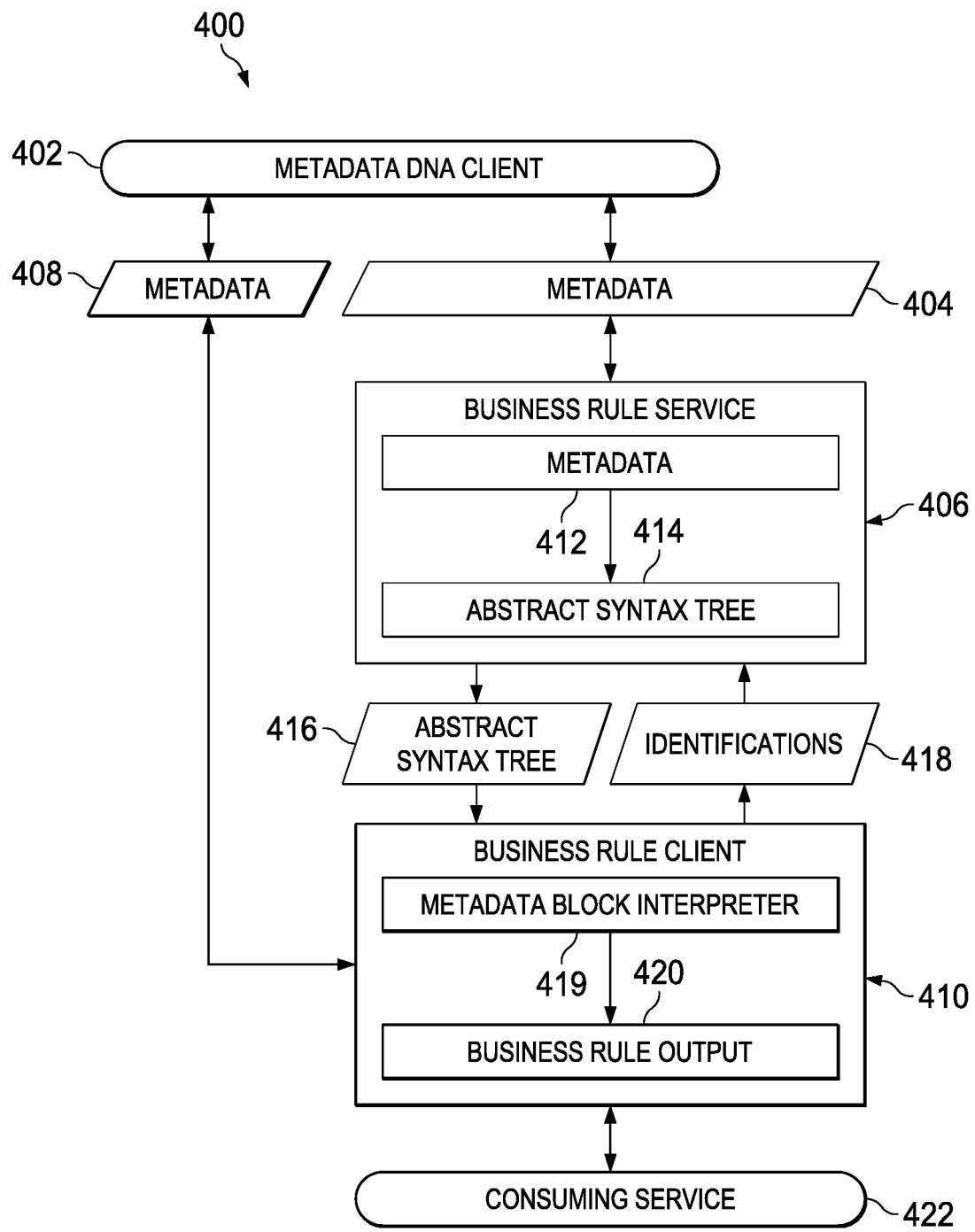
FIG. 4 is an illustration of a block diagram of another architecture of a metadata-based business rule system in accordance with an illustrative embodiment.

FIG. 4 is an illustration of a block diagram of another architecture of a metadata-based business rule system depicted in accordance with an illustrative embodiment. Business rule system 400 is an example of the novel business rule systems described herein. Business rule system 400 is presented as a network-based business system including both server computers and client computers. These computers may be, for example, data processing system 900 of FIG. 9. FIG. 4 illustrates the systemic differences between the prior art business systems in FIG. 1 and FIG. 2, and the illustrative embodiments in which the business rule interpreter needs no compiler step or executable code.

Business rule system 400 includes metadata DNA client 402 which provides metadata 408 to business rule client 410. This simple and direct process stands in contrast to the prior art, in which metadata DNA client 402 would have had to have provided metadata 404 to business rule service 406. Business rule service 406 would have been a server-side service which provides metadata 412 and abstract syntax tree 414.

In the prior illustrative embodiments, abstract syntax tree 416 and identifications 418 would have had to have been provided by business rule service 406 to business rule client 410. However, in the illustrative embodiments, all of these operations are bypassed, thereby dramatically increasing the speed and efficiency of the computer performing the desired process.

Business rule client 410 operates client-side and is often implemented in a Web browser in the client. Business rule client 410 includes metadata block interpreter 419 and business rule output 420. Metadata block interpreter 419 may also be termed as an "abstract syntax tree interpreter."

As with business rule system 300 of FIG. 3, one or more executor functions consisting of only atomic units of code defined by metadata are designated by business rule service 406 and provided to business rule client 410. Because the resulting combinations of the executor functions already have executable code, metadata block interpreter 419 is able to combine the blocks of metadata into an executable code ready for execution by consuming service 422. Thus, translation of metadata and the compilation of executable code is avoided, thereby dramatically increasing the speed of execution of a computer.

Business rule system 400 is a specific implementation of the illustrative embodiments. Thus, business rule 400 does not necessarily limit the claimed inventions, or other business rule systems described herein.

Figure 5:
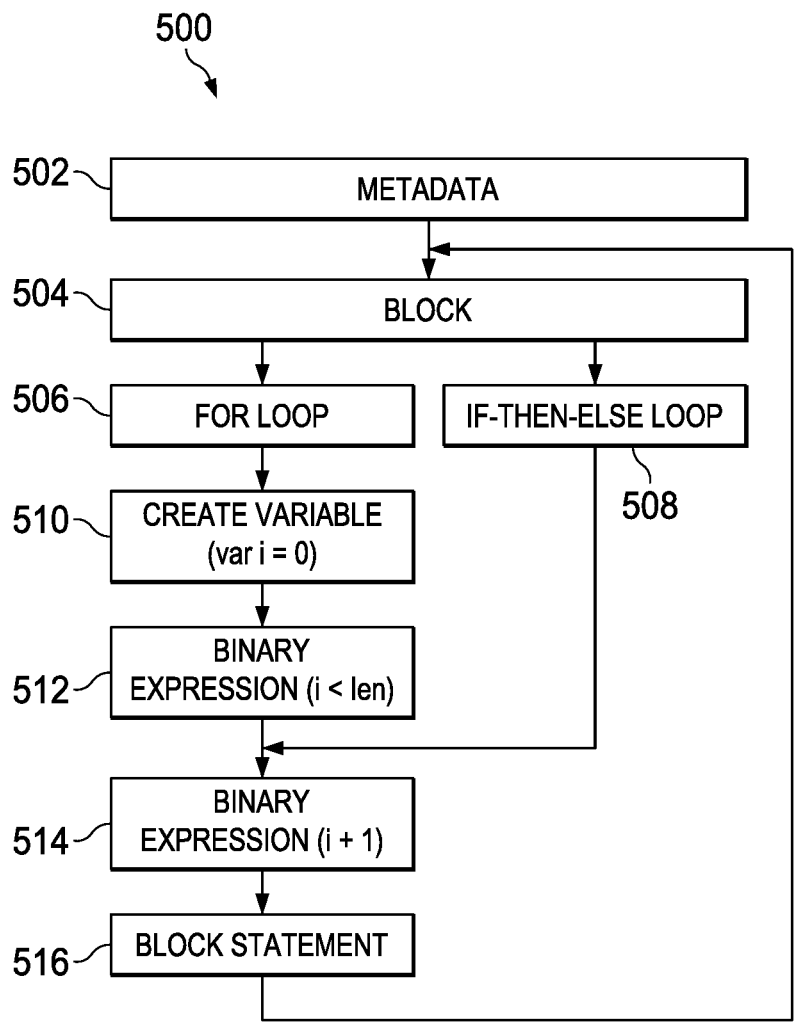
FIG. 5 is an illustration of a block diagram of another architecture of a metadata-based business rule system in accordance with an illustrative embodiment.

FIG. 5 is an illustration of a block diagram of another architecture of a metadata-based business rule system depicted in accordance with an illustrative embodiment. Business rule system 500 is an example of the novel business rule systems described herein. Business rule system 500 is presented as a network-based business system including both server computers and client computers. These computers may be, for example, data processing system 900 of FIG. 9. FIG. 5 shows similar "for-loop" and "if-then-else" processes as shown in FIG. 2, but with the reuse of atomic executors or components instead of the prior art systems.

Metadata 502 is the metadata input to the business rule interpreter. Block 504 represents one node in the metadata corresponding to a business rule interpreter executor.

Block 504 is provided to "for loop" 506. This operation refers to the delegation of the interpreter scope to the "for-loop" executor. This operation implies calling the atomic code component represented by the "for-loop" executor. The actual metadata object representing the "for-loop" block is passed into the corresponding "for-loop" executor. This metadata acts as a configuration object to the code being executed. The business rule execution context (or scope being executed against) is also provided to the executor.

Block 504 may also be provided, or alternatively provided, to "if-then-else loop" 508. This block represents the delegation of the interpreter scope to the "if-then-else" executor. This operation implies calling the atomic code component represented by the "if-then-else" executor. The actual metadata object representing the "for-loop" block is passed into the corresponding "for-loop" executor. This metadata acts as a configuration object to the code being executed. The business rule execution context (or scope being executed against) is also provided to the executor.

Block 510 represents an operation for demonstration of how "for-loop" 506 composes a "create-variable" executor and the instructions that the executor executes without actually compiling or writing any code. Likewise, block 512 represents an operation for demonstration of how "for loop" 506 composes a binary-expression helper and the instructions that the helper executes without actually compiling or writing any code. In this case, the "binary-expression" is a helper because it does not demand scope from its parent to execute.

Block 512 is an operation for demonstration of how "for loop" 506 and "if-then-else" loop 508 compose a "binary-expression" helper and the instructions that the helper executes without actually compiling or writing any code. In this case, the "binary-expression" is a helper because it does not demand scope from its parent toe execute. Many different blocks can delegate scope to the same helper. Block 114 is another operation for demonstration of how "for loop" 506 and "if-then-else" loop 508 can compose a "binary expression" helper, and performs a similar function.

Block statement 516 represents a type of executor which simply represents an enclosing block. They can be a whole function, a loop block, or a consequent/alternate. In this case, the "for loop" 506 and the "if-then-else loop" 508 delegate back to the same executor that originally called them because they are composing sub-blocks for execution.

Business rule system 500 is a specific implementation of the illustrative embodiments. Thus, business rule 500 does not necessarily limit the claimed inventions, or other business rule systems described herein.

FIG. 6 is an illustration of a graph comparing the speed of execution of a prior art compiler-based business rule system, such as those shown in FIG. 1 and FIG. 2, to a metadata-based business rule system, such as those shown in FIG. 3 through FIG. 5, based on testing in a real business environment, depicted in accordance with an illustrative embodiment.

Graph 600 is a bar graph that compares the execution time in hertz (hz) for the enumerated function types relative to an ordinary business rule engine (shown by drawing hash type 1) and the business rule interpreter of the illustrative embodiments (shown by drawing hash type 2). Thus, for each function type, two bars are shown. One bar showing execution speed of the corresponding function type for an ordinary business rule engine, and the other bar showing for execution speed of the corresponding function type for the business rule interpreter of the illustrative embodiments. As can be seen, the efficiency of the business rule interpreter of the illustrative embodiments vastly outstrips the efficiency of the ordinary business rule interpreter. The amount of speed increase is generally about ten times, but in some cases can be twenty times the speed, or more. This increase in speed can be attributed to the illustrative embodiments avoiding compilation time and avoiding the need to translate metadata and generate executable code from the translated metadata. Accordingly, the illustrative embodiments dramatically increase the speed of execution of a business rule system, with accompanying savings in time, money, equipment, and maintenance, as well as improving customer satisfaction and experience when interacting with the business system of the illustrative embodiments.

For reference, nine different function types are shown. These include add notification 602, calculation 604, date manipulation 606, FOR loop 608, GET length 610, IF-THEN-ELSE 612, regular expression 614, set variable 616, and sort 618. Many other commands and functions are possible with the illustrative embodiments, including combinations of the above functions, and including combinations of functions not shown in FIG. 6. However, by avoiding the generation of executable code in a compiler, the illustrative embodiments will dramatically increase the speed of execution of a computer, relative to the same computer implementing any existing business rule system which requires the compilation of and subsequent execution of executable code.

Alternatively stated, on the left axis are the block types (executors). The bottom axis shows hertz or operations per second, which is a measurement of execution speed commonly used to measure JAVASCRIPT® performance. In this figure, more operations per second are better.

Figure 7:
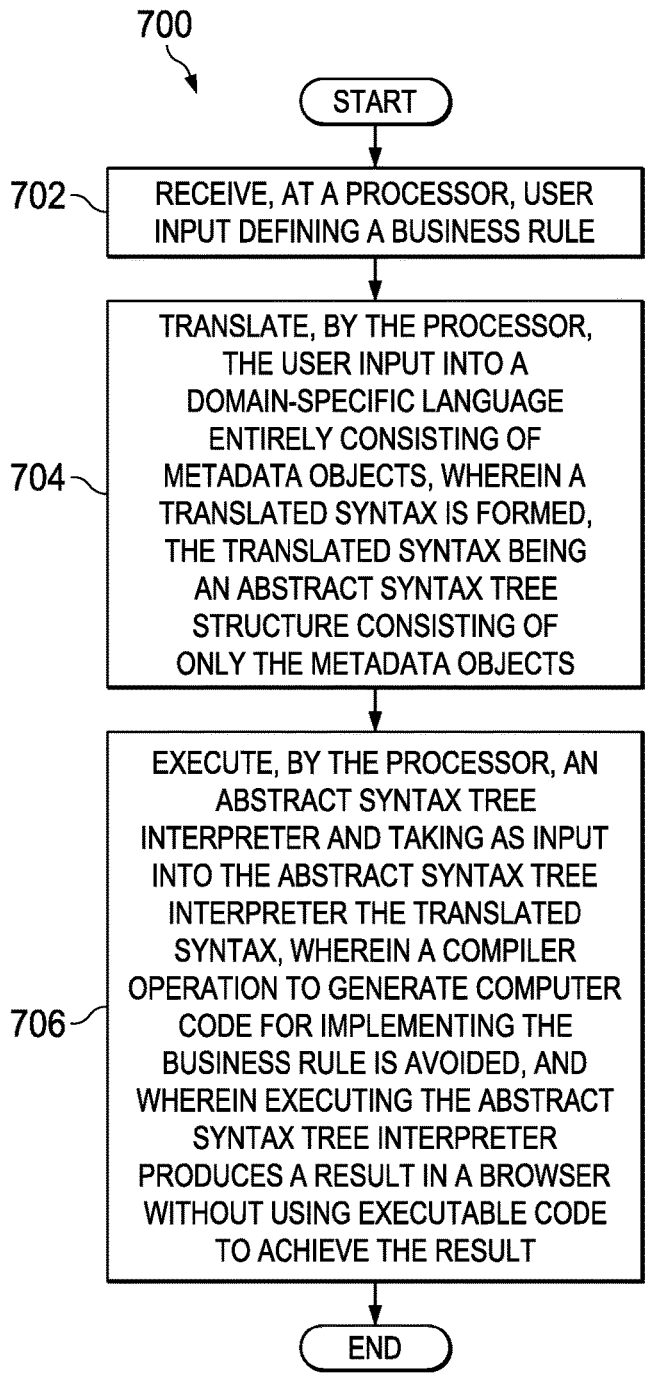
FIG. 7 is an illustration of a method of increasing a speed of operation of a computer via a metadata-based business rule interpreter, in accordance with an illustrative embodiment.

FIG. 7 is an illustration of a method of increasing a speed of operation of a computer via a metadata-based business rule interpreter, in accordance with an illustrative embodiment. Method 700 may be implemented by one or more computers, such as data processing system 900 of FIG. 9. Method 700 may be implemented in a business rule system, such as business rule system 300 of FIG. 3, business rule system 400 of FIG. 4, and business rule system 500 of FIG. 5.

Method 700 may be characterized as a method of increasing a speed of operation of a computer via a metadata-based business rule interpreter. Method 700 may include receiving, at a processor, user input defining a business rule (operation 702). Method 700 may also include translating, by the processor, the user input into a domain-specific language entirely consisting of metadata objects, wherein a translated syntax is formed, the translated syntax being an abstract syntax tree structure consisting of only the metadata objects (operation 704). Method 700 may also include executing, by the processor, an abstract syntax tree interpreter and taking as input into the abstract syntax tree interpreter the translated syntax, wherein a compiler operation to generate computer code for implementing the business rule is avoided, and wherein executing the abstract syntax tree interpreter produces a result in a browser without using executable code to achieve the result (operation 706). In one illustrative embodiment, the method may terminate thereafter.

Method 700 may be varied. For example, for method 700, receiving the user input may include receiving one or more pre-determined metadata objects. In this case, the user input may further include block types and properties of the block types.

In another illustrative embodiment, for method 700, the abstract syntax tree interpreter resides in the browser. In still another illustrative embodiment, the user input is further defined by a plurality of composable executor functions, each of which defines a single, atomic code construct. In this case, the composable executor functions may operate inside of a context defined at a beginning of a business rule execution step which is a target object for all symbols defined in a course of a business rule execution, as well as for all input to and output from the business rule. Furthermore, different permutations of compositions of the composable executor functions enables execution of different business rule behaviors at runtime.

Other variations are also possible. For example, the processor may execute the method at least ten times faster than execution of a business rule interpreter which uses a compiler to generate executable code from the user input for producing the result in the browser. Still further, more or fewer operations may be present relative to those shown in FIG. 7. Thus, the illustrative embodiments are not necessarily limited to the specific example shown in FIG. 7.

Figure 8:
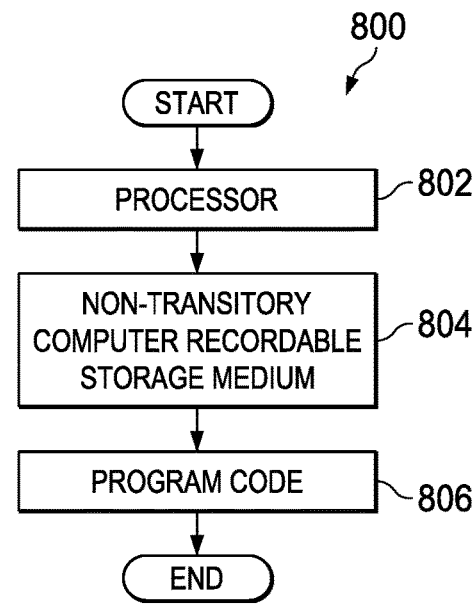
FIG. 8 is an illustration of a computer programmed with program code for implementing a method of increasing a speed of operation of a computer via a metadata-based business rule interpreter in accordance with an illustrative embodiment.

FIG. 8 is an illustration of a computer programmed with program code for implementing a method of increasing a speed of operation of a computer via a metadata-based business rule interpreter, in accordance with an illustrative embodiment. Business rule system 800 may be implemented by one or more computers, such as data processing system 900 of FIG. 9. Business rule system 800 may be an alternative to the business rule systems described above, such as business rule system 300 of FIG. 3, business rule system 400 of FIG. 4, and business rule system 500 of FIG. 5.

Business rule system 800 may include processor 802 and non-transitory computer recordable storage medium 804 connected to processor 802. Non-transitory computer-recordable storage medium 804 may store program code which, when executed by processor 802, performs a computer-implemented method of increasing a speed of operation of a computer via a metadata-based business rule interpreter.

Program code 806 may include program code for receiving, at a processor, user input defining a business rule. Program code 806 may also include program code for translating, by the processor, the user input into a domain-specific language entirely consisting of metadata objects, wherein a translated syntax is formed, the translated syntax being an abstract syntax tree structure consisting of only the metadata objects. Program code 806 may also include program code for executing, by the processor, an abstract syntax tree interpreter and taking as input into the abstract syntax tree interpreter the translated syntax, wherein a compiler operation to generate computer code for implementing the business rule is avoided, and wherein executing the abstract syntax tree interpreter produces a result in a browser without using executable code to achieve the result.

Business rule system 800 may be varied. For example, the program code for receiving the user input comprises program code for receiving one or more pre-determined metadata objects. In another example, the user input further comprises block types and properties of the block types.

In still another example, the user input is further defined by a plurality of composable executor functions, each of which defines a single, atomic code construct. In this case, program code 806 is further defined such that the composable executor functions operate inside of a context defined at a beginning of a business rule execution step which is a target object for all symbols defined in a course of a business rule execution, as well as for all input to and output from the business rule. Further yet, different permutations of compositions of the composable executor functions enables execution of different business rule behaviors at runtime.

Business rule system 800 may be still further varied. More or different components may be present, including but not limited to a bus, a user interface, a display system, networking hardware, and other components. Business rule system 800 may also be implemented as only a non-transitory computer-recordable storage medium storing program code, as described above. Thus, the illustrative embodiments are not necessarily limited by the specific examples described with respect to FIG. 8.

Figure 9:
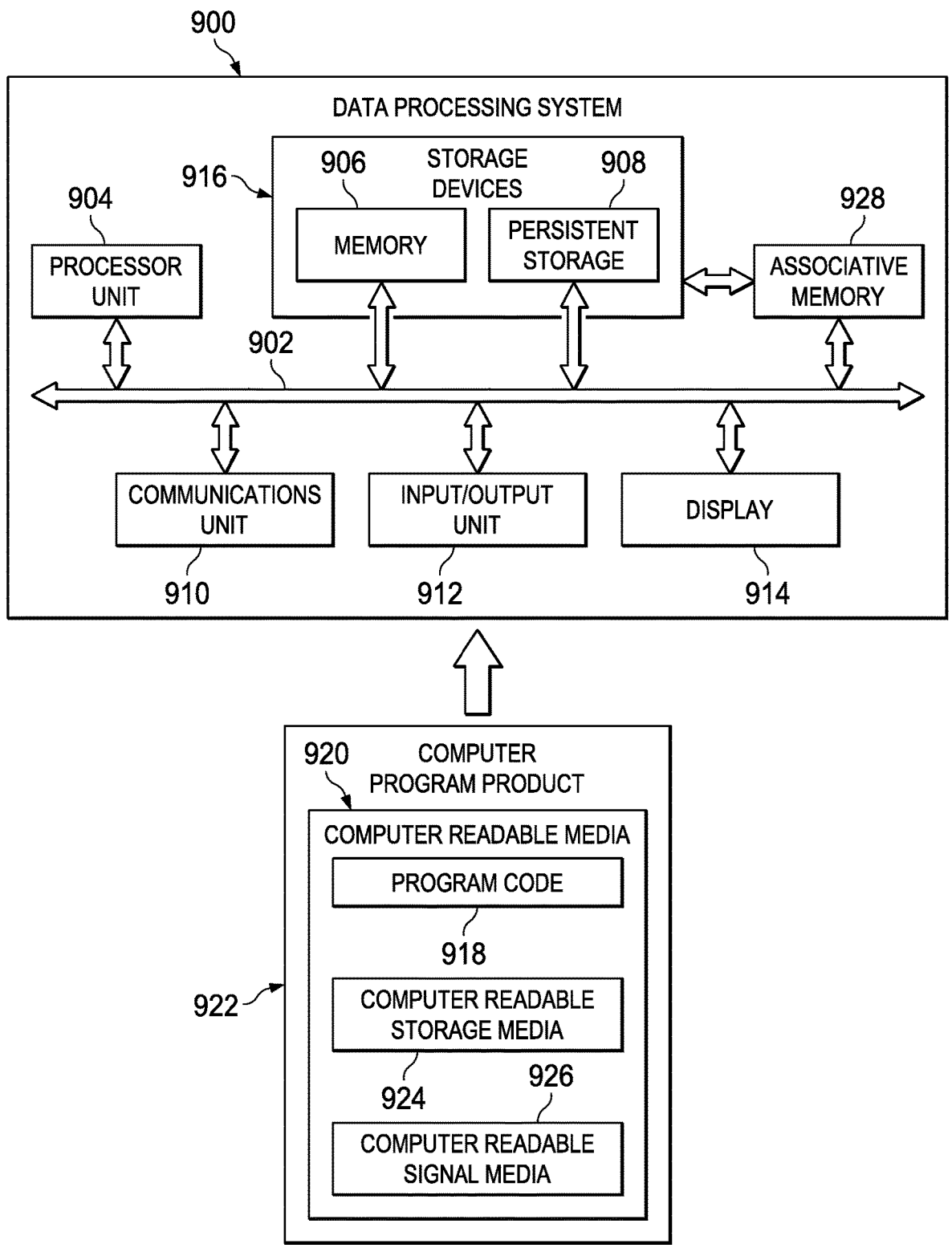
FIG. 9 is a block diagram of a data processing system in accordance with an illustrative embodiment.

FIG. 9 is a block diagram of a data processing system depicted in accordance with an illustrative embodiment. Data processing system 900 is an example of a computer that may be used to implement any of the illustrative embodiments described with respect to FIG. 1 through FIG. 8.

In this illustrative example, data processing system 900 includes communications framework 902, which provides communications between processor unit 904, memory 906, persistent storage 908, communications unit 910, input/output unit 912, and display 914. In this example, communication frameworks 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. The program code may be the software on a non-transitory computer-recordable storage medium usable to implement any of the illustrative embodiments described above. Storage devices 916 may also be referred to as computer-readable storage devices in these illustrative examples. Memory 906, in these examples, may be, for example, a random access memory or any other suitable volatile or non-volatile storage device. Persistent storage 908 may take various forms, depending on the particular implementation. Storage devices 916 may communicate with any of processor unit 904, communications unit 910, input/output unit 912, or display 914 through associative memory 928 and communications framework 902.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918.

Alternatively, program code 918 may be transferred to data processing system 900 using computer-readable signal media 926. Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components, in addition to or in place of those illustrated, for data processing system 900. Other components shown in FIG. 9 can be varied from the illustrative examples shown. The different embodiments may be implemented using any hardware device or system capable of running program code 918.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

As used herein, the term "server" or "server computer" is any computer which operates in the role of a server, whether or not the computer is configured specifically to operate as a "server." As used herein, the term "client" or "client computer" is any computer which operates in the roll of a client, whether or not the computer is configured specifically to operate as a "client" or a "workstation."

Many modifications and variations will be apparent to those of ordinary skill in the art. Further, different illustrative embodiments may provide different features, as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of increasing a speed of operation of a computer via a metadata-based business rule interpreter, the method comprising:
   receiving, at a processor, user input defining a business rule wherein:
      the user input comprises a plurality of composable executor functions, wherein at least one of the plurality of composable executor functions defines an atomic code construct; and
      the at least one of the plurality of composable executor functions operates inside of a context defined at a beginning of a business rule execution which is a target object for all symbols defined in a course of a business rule execution;
   translating, by the processor, the user input into a domain-specific language, the domain-specific language consisting of metadata objects, wherein the translating forms a translated syntax as between the user input and the metadata objects, the translated syntax being an abstract syntax tree structure consisting of only the metadata objects; and
   executing, by the processor, an abstract syntax tree interpreter and taking as input into the abstract syntax tree interpreter the translated syntax, wherein:
      a compiler operation to generate computer code for implementing the business rule is avoided; and
      executing the abstract syntax tree interpreter produces a result in a browser without using executable code to achieve the result.

2. The method of claim 1, wherein receiving the user input comprises receiving one or more pre-determined metadata objects.

3. The method of claim 2, wherein the user input further comprises block types and properties of the block types.

4. The method of claim 1, wherein the abstract syntax tree interpreter resides in the browser.

5. The method of claim 1, wherein each of the plurality of composable executor functions defines a single, atomic code construct.

6. The method of claim 5, wherein the target object is for all input to and output from the business rule.

7. The method of claim 6, wherein different permutations of compositions of the composable executor functions enables execution of different business rule behaviors at runtime.

8. The method of claim 1, wherein the translating and executing operates at least ten times faster than execution of a business rule interpreter which uses a compiler to generate executable code from the user input for producing the result in the browser.

9. A computer system comprising:
   a processor; and
   a non-transitory computer recordable storage medium connected to the processor and storing instructions which, when executed by the processor, causes the processor to implement a metadata-based business rule interpreter that:
      receives user input defining a business rule, wherein:
         the user input comprises a composable executor function that defines an atomic code construct; and
         the composable executor function operates inside of a context defined at a beginning of a business rule execution step which is a target object for all symbols defined in a course of execution of the business rule, and for all input to and output from the business rule;

translates the user input into a domain-specific language, the domain-specific language consisting of metadata objects, wherein translation forms a translated syntax as between the user input and the domain-specific language, the translated syntax being an abstract syntax tree structure consisting of only the metadata objects; and executes an abstract syntax tree interpreter and taking as input into the abstract syntax tree interpreter the translated syntax, wherein a compiler operation to generate computer code for implementing the business rule is avoided, and wherein executing the abstract syntax tree interpreter produces a result in a browser without using executable code to achieve the result.

10. The computer system of claim 9, wherein the user input comprises one or more pre-determined metadata objects.

11. The computer system of claim 10, wherein the user input further comprises block types and properties of the block types.

12. The computer system of claim 9, wherein the user input further comprises a plurality of composable executor functions, each of which defines a single, atomic code construct.

13. The computer system of claim 12 wherein the plurality of composable executor functions operate inside of the context.

14. The computer system of claim 13, wherein different permutations of compositions of the composable executor functions enables execution of different business rule behaviors at runtime.

15. A computer program product comprising:
a non-transitory computer recordable storage medium including instructions for increasing speed of operation of a computer via a metadata-based business rule interpreter, the instructions comprising:
first program code for receiving user input defining a business rule, wherein:
the user input comprises a composable executor function;
the composable executor function defines an atomic code construct; and
the composable executor function operates inside of a context defined at a beginning of a business rule execution step which is a target object for all symbols defined in a course of execution of the business rule;

second program code for translating the user input into a domain-specific language, the domain-specific language consisting of metadata objects, wherein the translating forms a translated syntax as between the business rule and the metadata objects, the translated syntax being an abstract syntax tree structure consisting of only the metadata objects; and third program code for executing an abstract syntax tree interpreter and taking as input into the abstract syntax tree interpreter the translated syntax, wherein a compiler operation to generate computer code for implementing the business rule is avoided, and wherein executing the abstract syntax tree interpreter produces a result in a browser without using executable code to achieve the result.

16. The computer program product of claim 15, wherein the first program code comprises fourth program code for receiving one or more pre-determined metadata objects.

17. The computer program product of claim 16, wherein the user input further comprises block types and properties of the block types.

18. The computer program product of claim 17, wherein the user input is further defined by a plurality of composable executor functions, each of which defines the atomic code construct.

19. The computer program product of claim 18, wherein the composable executor functions operate inside of a context defined at a beginning of a business rule execution step which is a target object for all symbols defined in a course of a business rule execution, as well as for all input to and output from the business rule.

20. The computer program product of claim 19, wherein different permutations of compositions of the composable executor functions enables execution of different business rule behaviors at runtime.

* * * * *